(12) United States Patent
Lutzer et al.

(10) Patent No.: US 12,134,473 B2
(45) Date of Patent: Nov. 5, 2024

(54) WASTEWATER TANK ARRANGEMENT FOR AN AIRCRAFT

(71) Applicant: Airbus Operations GmbH, Hamburg (DE)

(72) Inventors: Wilhelm Lutzer, Hamburg (DE); Ulrich Rieger, Hamburg (DE); Eberhard Gumbert, Hamburg (DE); Carsten Ohlfest, Hamburg (DE); Holger Brilsky, Hamburg (DE); Gerke Popken, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/199,087

(22) Filed: May 18, 2023

(65) Prior Publication Data

US 2023/0286654 A1    Sep. 14, 2023

Related U.S. Application Data

(62) Division of application No. 17/217,140, filed on Mar. 30, 2021, now Pat. No. 11,691,734.

(30) Foreign Application Priority Data

Mar. 31, 2020 (DE) ...................... 10 2020 108 936.8

(51) Int. Cl.
*B64D 11/02* (2006.01)
*B64D 11/04* (2006.01)
(Continued)

(52) U.S. Cl.
CPC .............. *B64D 11/02* (2013.01); *B64D 11/04* (2013.01); *F16L 27/0804* (2013.01); *F16L 27/1012* (2013.01); *F16L 27/11* (2013.01)

(58) Field of Classification Search
CPC ....... F16L 27/02; F16L 27/08; F16L 27/0804; F16L 27/0849; B64D 11/02; B64D 11/04
See application file for complete search history.

(56) References Cited

U.S. PATENT DOCUMENTS

| 3,574,354 A | 4/1971 | Mischel |
| 3,704,034 A | 11/1972 | Shire et al. |

(Continued)

FOREIGN PATENT DOCUMENTS

| DE | 102004042147 A1 | 3/2006 |
| DE | 102010019777 A1 | 11/2011 |

(Continued)

OTHER PUBLICATIONS

Machine translation WO 2018101199.*
German Search Report for Application No. 102020108936 dated Feb. 8, 2021.

*Primary Examiner* — Kevin F Murphy
(74) *Attorney, Agent, or Firm* — KDW Firm PLLC

(57) ABSTRACT

A wastewater tank arrangement for an aircraft, including a wastewater tank and a drain pipe having a first end and an opposite second end, the drain pipe fastened with its first end to the wastewater tank and having a second end for connection to a service panel in the aircraft structure. Providing a wastewater tank arrangement can effectively compensate tolerances between the wastewater tank and the service panel, and can effectively compensate installation and manufacturing tolerances during the course of the initial installation, in that the wastewater tank arrangement has a tolerance compensation device configured to connect the second end of the drain pipe to the service panel and compensate tolerances between the second end of the drain pipe and the service panel.

18 Claims, 6 Drawing Sheets

(51) Int. Cl.
    *F16L 27/08*    (2006.01)
    *F16L 27/10*    (2006.01)
    *F16L 27/11*    (2006.01)

(56) References Cited

U.S. PATENT DOCUMENTS

| | | |
|---|---|---|
| 4,436,326 A | 3/1984 | Peaster |
| 8,712,227 B2 | 4/2014 | Meisiek et al. |
| 9,599,263 B2 * | 3/2017 | Lutzer .................... B64D 11/02 |
| 10,746,332 B1 * | 8/2020 | Haines .................... F16L 27/06 |
| 2019/0368172 A1 * | 12/2019 | Chung ................ F16L 27/0804 |
| 2020/0094937 A1 | 3/2020 | Linde et al. |
| 2021/0300564 A1 | 9/2021 | Lutzer et al. |

FOREIGN PATENT DOCUMENTS

| | | | |
|---|---|---|---|
| DE | 102018123531 A1 | 3/2020 | |
| WO | WO-2018101199 A1 * | 6/2018 | ............ F16L 21/005 |

\* cited by examiner

WASTEWATER TANK ARRANGEMENT FOR AN AIRCRAFT

CROSS-REFERENCE TO RELATED APPLICATION

This application is a divisional application which claims priority to U.S. patent application Ser. No. 17/217,140 filed Mar. 30, 2021, which claims priority to German Patent Application DE 10 2020 108 936.8 filed Mar. 31, 2020, the entire disclosures of which are incorporated by reference herein.

TECHNICAL FIELD

The disclosure herein relates to a wastewater tank arrangement for an aircraft, in particular for an aircraft toilet. Further aspects of the disclosure herein relate to a tolerance compensation device for a wastewater tank arrangement of the type, to a second pipe piece for a tolerance compensation device of the type, and to an aircraft having a wastewater tank arrangement of the type or having a tolerance compensation device of the type.

BACKGROUND

The wastewater tank arrangement comprises a wastewater tank and a drain pipe. The drain pipe is of rigid or preferably flexible form, for example in the form of a hose, and serves for the emptying of the wastewater tank. The drain pipe has a first end and an opposite second end, the drain pipe being fastened with its first end to the wastewater tank and being provided with its second end for connection to a service panel, that is to say a maintenance panel, in the aircraft structure, in particular in the outer skin. It is then for example possible for a wastewater vehicle or carriage to be positioned at the service panel, into which wastewater vehicle or carriage the wastewater can be emptied from the wastewater tank through the drain pipe. Also, the valve for the emptying of the wastewater tank may be actuated by a lever on the service panel.

Relatively large tolerances may arise between the wastewater tank and the service panel, which tolerances are normally made up of manufacturing tolerances, installation tolerances and tolerances from deformations of the aircraft structure as a result of load during operation, for example as a result of flight maneuvers. Installation and manufacturing tolerances can be compensated by suitable measures during the initial installation. The tolerances arising as a result of deformation must be compensated by movable components, for example through the use of a flexible drain pipe. Such a flexible drain pipe can compensate more tolerances the longer it is. Since it is however commonly preferred from a structural aspect, and in order to save space and weight, to use as short a drain pipe as possible, it is often not possible or not sensibly possible for more than the tolerances arising as a result of deformation to be compensated by a flexible drain pipe. It is therefore basically desirable if the installation and manufacturing tolerances can already be compensated by suitable means during the initial installation.

SUMMARY

It is the object of the disclosure herein to provide a wastewater tank arrangement which can effectively compensate tolerances between the wastewater tank and the service panel, in particular can effectively compensate installation and manufacturing tolerances during the course of the initial installation.

The object is achieved in that the wastewater tank arrangement has a separate tolerance compensation device which is configured to connect the second end of the drain pipe to the service panel and compensate tolerances, in particular during the installation process, between the second end of the drain pipe and the service panel, preferably in a plane perpendicular to the extent of the drain pipe. In this way, installation and manufacturing tolerances between the wastewater tank and the service panel can be effectively compensated already during the course of the initial installation, without the need to make use of the flexibility of the drain pipe for this purpose.

In a preferred embodiment, the tolerance compensation device comprises a first pipe piece and a second pipe piece, both preferably with a round, in particular circular cross section. The first pipe piece and the second pipe piece are arranged in series along a longitudinal axis, such that wastewater can flow through the two pipe pieces in succession. Here, the longitudinal axis is preferably the central axis or axis of symmetry of the first pipe piece. Here, the second pipe piece is movable relative to the first pipe piece perpendicularly with respect to the longitudinal axis, such that tolerances perpendicular to the longitudinal axis can be compensated. This applies at least for the assembly or initial installation process. After the installation and manufacturing tolerances have been compensated during the assembly process by the tolerance compensation device, the tolerance compensation device can be fixed, for example by tightening of screws or by pinching of parts which lie against one another, such that a movement of the second pipe piece relative to the first pipe piece is no longer possible. Alternatively, the tolerance compensation device may however also be designed or used such that the second pipe piece is movable relative to the first pipe piece even during operation.

Here, it is particularly preferred if the first pipe piece is movable relative to the second pipe piece two-dimensionally in a plane perpendicular to the longitudinal axis, that is to say in all directions perpendicular to the longitudinal axis. In this way, tolerances can be compensated in the entire plane perpendicular to the longitudinal axis. It is alternatively also possible for the first pipe piece to be movable relative to the second pipe piece only in some but not all directions perpendicular to the longitudinal axis.

Here, it is furthermore preferred if the first pipe piece is configured to be connected preferably rigidly to the service panel, and the second pipe piece is connected rigidly or movably to the second end of the drain pipe or is configured for connection thereto. For example, the second end of the drain pipe may project into a funnel of the second pipe piece without being fixedly connected thereto. This allows great freedom of movement of the two parts relative to one another and facilitates the assembly process.

In a preferred embodiment, the first pipe piece has a gap which extends perpendicularly with respect to the longitudinal axis and which is inwardly open and which preferably runs in encircling fashion in a circumferential direction. The second pipe piece has a flange which extends outward, in particular projects outward, perpendicularly with respect to the longitudinal axis and which preferably runs in encircling fashion in a circumferential direction, in particular a T-shaped flange. The first pipe piece and the second pipe piece are connected to one another such that the flange is arranged in the gap such that a movement of the second pipe piece relative to the first pipe piece, in particular perpendicularly with respect to the longitudinal axis, is possible within the extent of the gap. A particularly simple and effective tolerance compensation device is formed in this way.

Here, it is particularly preferred if the flange is arranged in the gap with play such that the flange is movable in the gap perpendicularly with respect to the longitudinal axis, and thus the second pipe piece is movable relative to the first pipe piece perpendicularly with respect to the longitudinal axis. The amount of play may be equal in all directions, but may also differ in different directions, for example in the case of an eccentric shape of the gap. In this way, the second pipe piece can preferably be both rotated about the longitudinal axis, and also displaced perpendicularly with respect to the longitudinal axis, relative to the first pipe piece.

In a preferred embodiment, the second pipe piece has an eccentric shape, whereby, in the event of a rotation of the second pipe piece relative to the first pipe piece about the longitudinal axis, the second pipe piece is movable relative to the first pipe piece in a plane perpendicular to the longitudinal axis. In this way, by a rotation of the second pipe piece relative to the first pipe piece about the longitudinal axis, a movement of the second pipe piece, in particular of the second end of the second pipe piece, in a plane perpendicular to the longitudinal axis, and thus tolerance compensation in the plane, can be realized.

Here, it is particularly preferred if the second pipe piece has a first end and an opposite second end and a first channel situated between the first and second ends. The first end is connected to the first pipe piece concentrically rotatably about the longitudinal axis, and the first channel runs obliquely relative to the longitudinal axis, such that the second end is arranged eccentrically with respect to the longitudinal axis. That is to say, the pipe cross section at the second end is arranged eccentrically with respect to the longitudinal axis, in particular so as to be offset perpendicularly with respect to the longitudinal axis, relative to the pipe cross section at the first end, such that the central axis of the second end is preferably parallel to and spaced apart from the central axis of the first end or from the longitudinal axis. In this way, a simple eccentric shape of the second pipe piece is formed, wherein, as a result of rotation of the second pipe piece relative to the first pipe piece about the longitudinal axis, the position of the second end of the second pipe piece in a plane perpendicular to the longitudinal axis can be adapted, and tolerance compensation can thus be implemented.

It is further preferred here if the first channel is of funnel-shaped form with a cross-sectional narrowing toward the first end of the second pipe piece. Such a funnel shape of the channel allows mobility of the drain pipe relative to the second pipe piece, in particular of the second end of the drain pipe relative to the second end of the second pipe piece, because the second end of the drain pipe can be arranged with play in the funnel of the second end of the second pipe piece.

It is preferred here if the second end of the second pipe piece is connected to the second end of the drain pipe or is configured for connection thereto. A particularly simple and effective design is made possible in this way.

Alternatively, it is preferred if the tolerance compensation device comprises a third pipe piece which has a first end and an opposite second end and a second channel situated between the first and second ends. The first end of the third pipe piece is connected to the second end of the second pipe piece, or configured for connection thereto, rotatably, preferably rotatably eccentrically with respect to the longitudinal axis and concentrically with respect to the central axis of the second end of the second pipe piece, preferably about an axis which is parallel and offset with respect to the longitudinal axis. The second end of the third pipe piece is preferably connected to the second end of the drain pipe or configured for connection thereto. A very extensive and exact movement of the second end of the third pipe piece relative to the first pipe piece perpendicularly with respect to the longitudinal axis, and thus very extensive and exact tolerance compensation, are made possible by such a third pipe piece.

It is particularly preferred here if the second channel runs obliquely with respect to the longitudinal axis, such that the second end of the third pipe piece is arranged eccentrically with respect to the second end of the second pipe piece, in particular with respect to the central axis of the second end of the second pipe piece, and with respect to the first end of the third pipe piece. That is to say, the pipe cross section at the second end of the third pipe piece is arranged eccentrically with respect to the central axis of the second end of the second pipe piece and of the first end of the third pipe piece, in particular is arranged offset with respect to the pipe cross section at the first end of the third pipe piece perpendicularly with respect to the longitudinal axis, such that the central axis of the second end of the third pipe piece is preferably parallel to and spaced apart from the central axis of the first end of the third pipe piece and of the second end of the second pipe piece. An even more extensive and even more exact movement of the second end of the third pipe piece relative to the first pipe piece perpendicularly with respect to the longitudinal axis, and thus even more extensive and even more exact tolerance compensation, can be made possible by such an eccentric third pipe piece.

It is furthermore particularly preferred if the second channel is of funnel-shaped form with a cross-sectional narrowing toward the first end of the third pipe piece. The funnel shape of the second channel is preferably formed such that, particular rotational positions of the third pipe piece relative to the second pipe piece, in particular in the extreme positions in which the first channel and the second channel are in alignment, that is to say run in the same direction, the gradient of the funnel of the third pipe piece at the transition to the second pipe piece merges into the gradient of the funnel of the second pipe piece, such that a continuous transition without a bend is formed between the first channel and the second channel. In this way, a common funnel can be formed by the second and third pipe pieces, such that extensive mobility of the drain pipe relative to the third pipe piece, in particular of the second end of the drain pipe relative to the second end of the third pipe piece, is made possible, because the second end of the drain pipe can be arranged with play in the funnel of the second end of the third pipe piece.

According to a preferred embodiment, the second pipe piece is of flexible, that is to say movable or deformable, form. In particular, the second pipe piece has a flexible shape or is formed from a flexible material. Preferably, the second pipe piece is flexible with respect to its axial direction, that is to say along the longitudinal axis, and/or with respect to its radial direction and/or with respect to twisting about the longitudinal axis and/or about one or more transverse axes perpendicular to the longitudinal axis. In this way, by the second pipe piece, it is possible in particular for those tolerances which arise from the deformations of the aircraft structure during flight to be compensated. If the second pipe piece can compensate these deformation tolerances, it is not necessary for these to be compensated by the drain pipe, such that the drain pipe can preferably be of very short and optionally also rigid form.

Here, it is particularly preferred if the second pipe piece is formed as a corrugated bellows. The corrugated bellows preferably has, as viewed along the longitudinal axis, at least one corrugation, preferably multiple corrugations, which corrugation projects inward and/or outward perpendicularly with respect to the longitudinal axis and preferably runs in encircling fashion in a circumferential direction. With a corrugated bellows of the type, the second pipe piece can particularly effectively be of flexible form, because movements or deformations of the second pipe piece both in an axial direction and in a radial direction are made possible by the corrugations of the corrugated bellows without the need for significant tensile elongation of the material of the second pipe piece. In this way, it is also the case that no loads, in particular no loads in the direction of the longitudinal axis between the service panel or the aircraft structure and the wastewater tank, are transmitted across the corrugated bellows. Twisting movements in all directions are also allowed to a certain degree by the corrugated bellows. Furthermore, the corrugated bellows, owing to its corrugated form, tolerates a high level of both positive pressure and negative pressure in its interior, without thereby being significantly deformed or overloaded.

Here, it is furthermore preferred if the second pipe piece is formed entirely or partially from a rubber material. Such a rubber material is firstly elastically extensible, whereby the flexibility of the second pipe piece is attained or increased. Secondly, the rubber material forms an insulator against cold entering the interior of the aircraft, and an electrical insulator for example against lightning strikes.

Here, it is furthermore preferred if the clamping of the flange in the gap can in the is realized in that an upper disk above the gap is pressed against a lower disk below the gap, wherein the flange is arranged between the upper disk and the lower disk. The pressing and fixing of the upper disk and of the lower disk against one another is performed preferably by a clamping ring which engages with the upper and the lower disk from radially outside. For further sealing, it is preferable for one or more encircling annular beads to be formed on the surface of the upper and/or of the lower disk, which annular beads squeeze the flange in punctiform fashion with even greater intensity and thus seal off the flange. The second pipe piece may be connected to the drain pipe preferably by way of an attachment flange which extends downward, parallel to the longitudinal axis, from the outer side of the drain pipe and against which the second end of the second pipe piece is pressed for example by a tension ring and thus fastened. The drain pipe may in this case preferably extend with its second end in a funnel shape into the upper opening at the second end of the second pipe piece and be connected at its first end via a valve to the wastewater tank. Here, the drain pipe can preferably be of very short and/or rigid form, for example composed of metal, which leads to a compact design.

A further aspect of the disclosure herein relates to a tolerance compensation device for a wastewater tank arrangement according to one of the above-described embodiments, comprising a first pipe piece and a second pipe piece, the first pipe piece and the second pipe piece being arranged in series along a longitudinal axis, such that wastewater can flow through the two pipe pieces in succession, wherein the second pipe piece is movable relative to the first pipe piece perpendicularly with respect to the longitudinal axis. The features and effects discussed above in conjunction with the wastewater tank arrangement are likewise applicable and preferred vis-à-vis in the case of the tolerance compensation device.

A further aspect of the disclosure herein relates to a second pipe piece for a tolerance compensation device according to any of the embodiments described above. The features and effects discussed above in conjunction with the tolerance compensation device are likewise applicable and preferred vis-à-vis in the case of the second pipe piece.

In a preferred embodiment, the second pipe piece has a first end and an opposite second end and a first channel situated between the first and second ends. Preferably, the second pipe piece has a flange which, at the first end, extends outward perpendicularly with respect to the longitudinal axis. Preferably, the second pipe piece is furthermore formed as a corrugated bellows which, as viewed along the longitudinal axis, has at least one corrugation, preferably multiple corrugations, which corrugation projects inward or outward perpendicularly with respect to the longitudinal axis. The features and effects of the corrugated bellows discussed further above in conjunction with the tolerance compensation device are likewise applicable and preferred vis-à-vis in the case of the second pipe piece discussed here.

A yet further aspect of the disclosure herein relates to an aircraft, in particular with an aircraft toilet, having a wastewater tank arrangement according to any of the above-described embodiments or having a tolerance compensation device according to any of the above-described embodiments. The features and effects discussed above in conjunction with the wastewater tank arrangement and the tolerance compensation device are likewise applicable and preferred vis-à-vis in the case of the aircraft.

BRIEF DESCRIPTION OF THE DRAWINGS

Preferred embodiments of the disclosure herein will be discussed in more detail below on the basis of a drawing. In the drawing.

DETAILED DESCRIPTION

Figure 1:
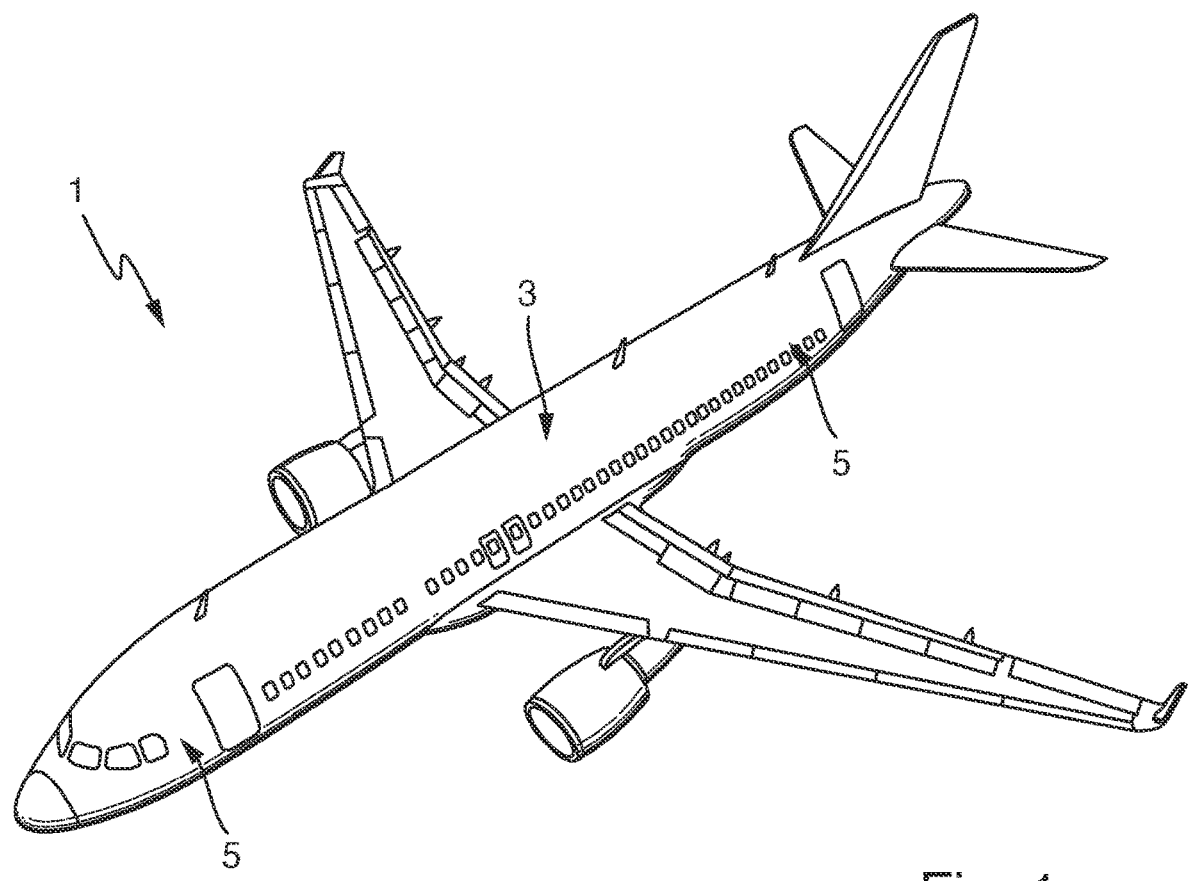
FIG. 1 shows an aircraft according to an embodiment of the disclosure herein.

FIG. 1 illustrates an aircraft 1 which, in the interior compartment 3 thereof, has an aircraft toilet 5 (not visible).

Figure 2:
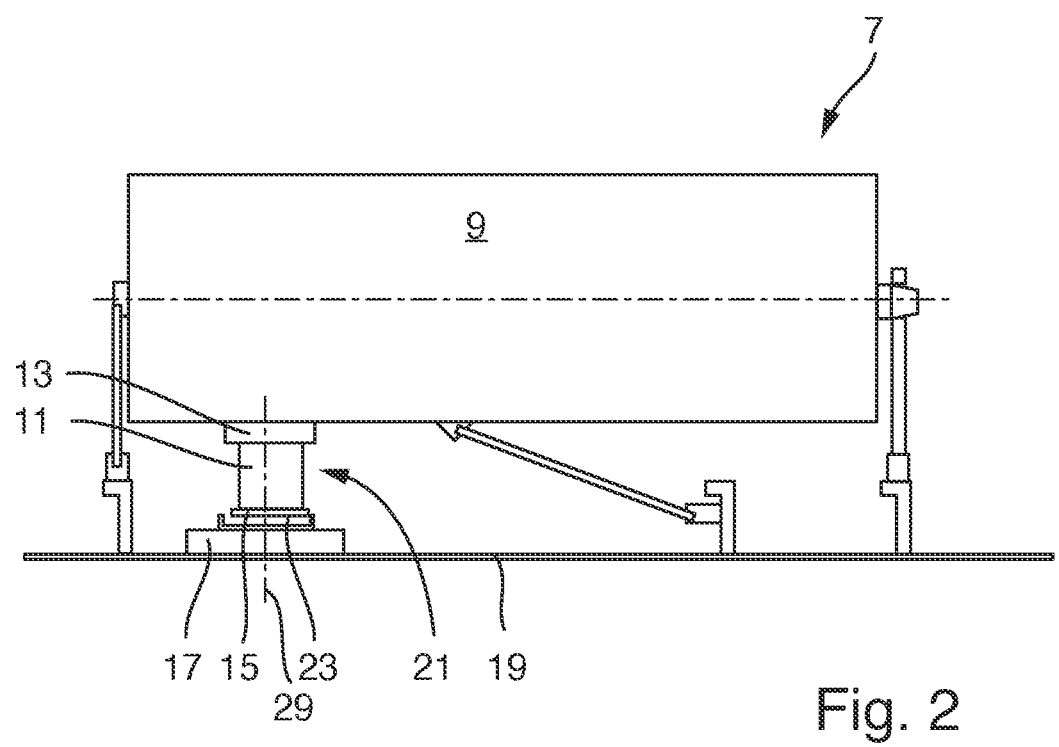
FIG. 2 shows a wastewater tank arrangement according to an embodiment of the disclosure herein.

The aircraft toilet 5 has a wastewater tank arrangement 7 according to the disclosure herein, which is illustrated in more detail in FIG. 2.

As shown in FIG. 2, the wastewater tank arrangement 7 comprises a wastewater tank 9 and a drain pipe 11 for the emptying of the wastewater tank 9. The drain pipe 11 is of flexible form, in the form of a hose, and has a first end 13 and an opposite second end 15, wherein the drain pipe 11 is connected with its first end 13 to the wastewater tank 9 and is connected with its second end 15 to a service panel 17, which is provided in an outer skin 19 of the aircraft 1 and at which, by opening of a valve 21, wastewater can be emptied from the wastewater tank 9 through the drain pipe 11.

The wastewater tank arrangement 7 furthermore has a tolerance compensation device 23 which connects the second end 15 of the drain pipe 11 to the service panel 17 and which compensates tolerances between the second end 15 of the drain pipe 11 and the service panel 17 in a plane perpendicular to the extent of the drain pipe 11 and parallel to the outer skin 19. Three preferred example embodiments of the tolerance compensation device 23 are illustrated in FIGS. 3 to 9.

The tolerance compensation device 23 of all three example embodiments comprises a first pipe piece 25 and a second pipe piece 27 with circular cross section. The first pipe piece 25 and the second pipe piece 27 are arranged in series along a longitudinal axis 29, such that wastewater can flow through the two pipe pieces 25, 27 in succession. The longitudinal axis 29 is in this case the central axis of the first pipe piece 25. Here, the second pipe piece 27 is movable relative to the first pipe piece 25 in a plane perpendicular to the longitudinal axis 29, such that tolerances perpendicular to the longitudinal axis 29 can be compensated. In the present example embodiments, this applies to the assembly or initial installation process. After the installation and manufacturing tolerances have been compensated during the assembly process by the tolerance compensation device 23, the tolerance compensation device 23 is fixed such that a movement of the second pipe piece 27 relative to the first pipe piece 25 is no longer possible.

Figure 3:
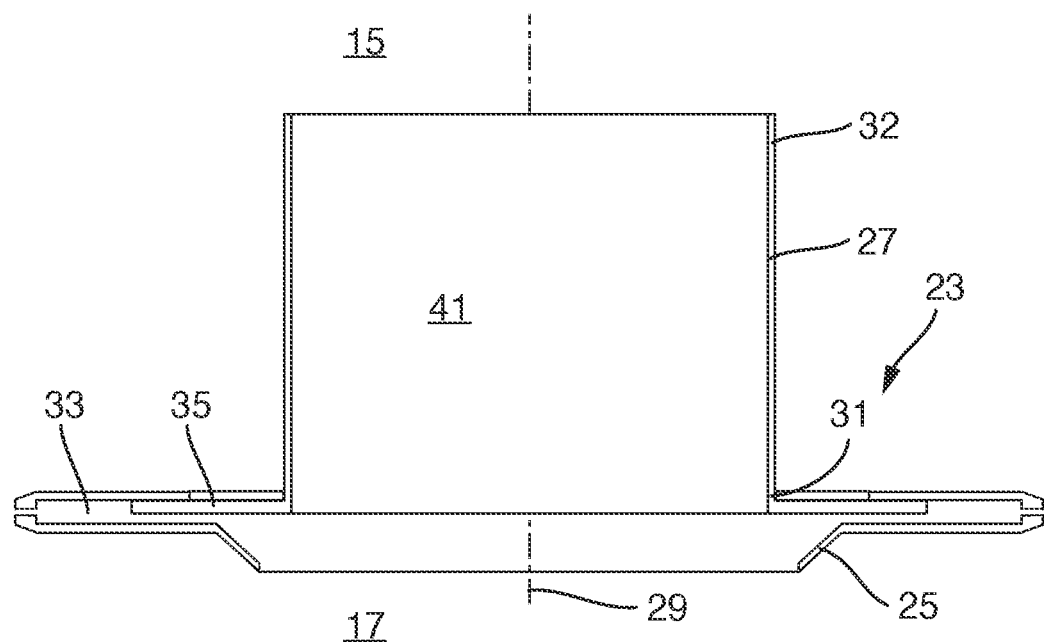
FIG. 3 shows a tolerance compensation device according to a first example embodiment, wherein the first and second pipe pieces are arranged concentrically.
Figure 4:
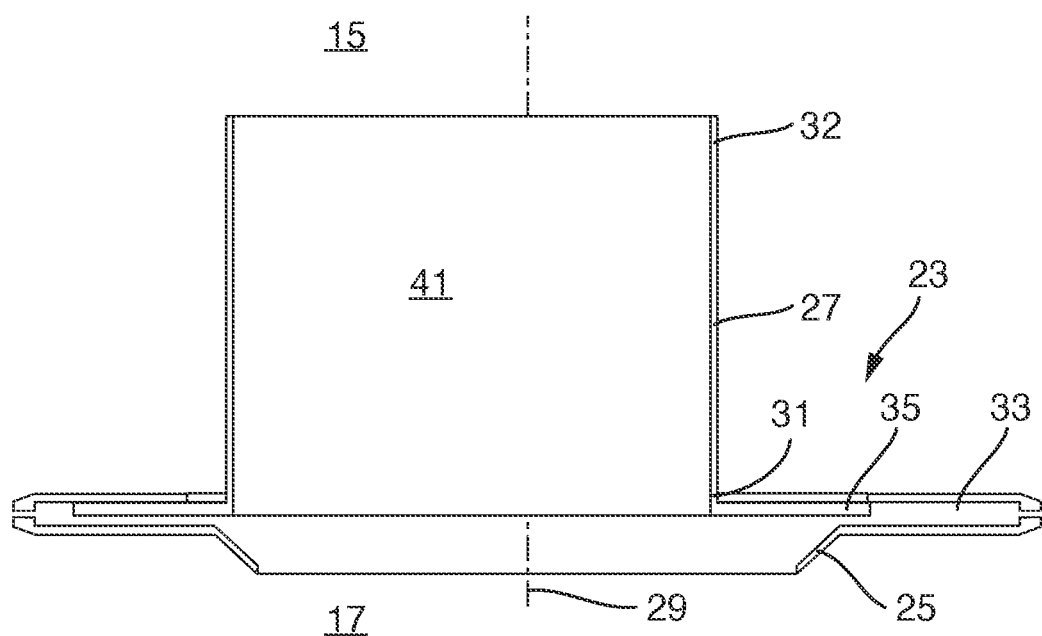
FIG. 4 shows the tolerance compensation device from FIG. 3, wherein the first and second pipe pieces are arranged eccentrically.

In the example embodiment shown in FIGS. 3 and 4, the first pipe piece 25 is rigidly connected to the service panel 17, and the second pipe piece 27 is connected to the second end 15 of the drain pipe 11. Here, the second end 15 of the drain pipe 11 projects with a certain degree of play into the end of the second pipe piece 27 facing toward the drain pipe 11, but without being fixedly connected thereto.

The first pipe piece 25 has a gap 33 which extends perpendicularly with respect to the longitudinal axis 29 and which is inwardly open and which runs in encircling fashion in a circumferential direction. The second pipe piece 27 has a flange 35 which projects outward perpendicularly with respect to the longitudinal axis 29 and which runs in encircling fashion in the circumferential direction. The first pipe piece 25 and the second pipe piece 27 are connected to one another such that the flange 35 is arranged in the gap 33, such that a movement of the second pipe piece 27 relative to the first pipe piece 25 perpendicularly with respect to the longitudinal axis 29 is possible within the extent of the gap 33. Here, the flange 35 is arranged in the gap 33 with play such that the flange 35 is movable in the gap 33 perpendicularly with respect to the longitudinal axis 29, and thus the second pipe piece 27 is movable relative to the first pipe piece 25 perpendicularly with respect to the longitudinal axis 29, for example between a concentric position (see FIG. 3) and an eccentric position (see FIG. 4).

Figure 5:
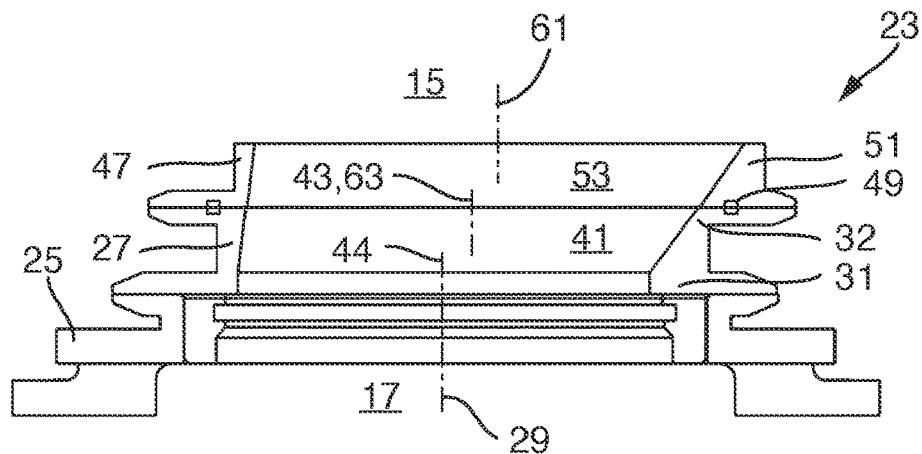
FIG. 5 shows a tolerance compensation device according to a second example embodiment, wherein the first and second pipe pieces are arranged in an extreme right-hand position.
Figure 6:
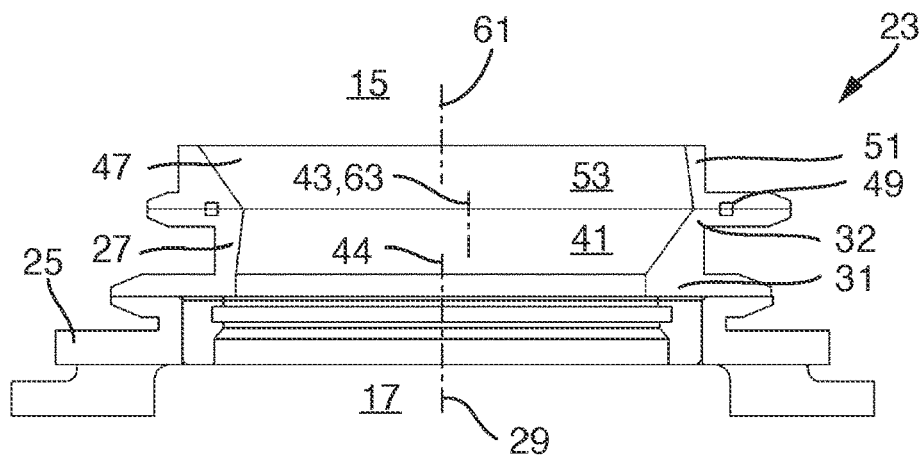
FIG. 6 shows the tolerance compensation device from FIG. 5, wherein the first and second pipe pieces are arranged in a neutral position.
Figure 7:
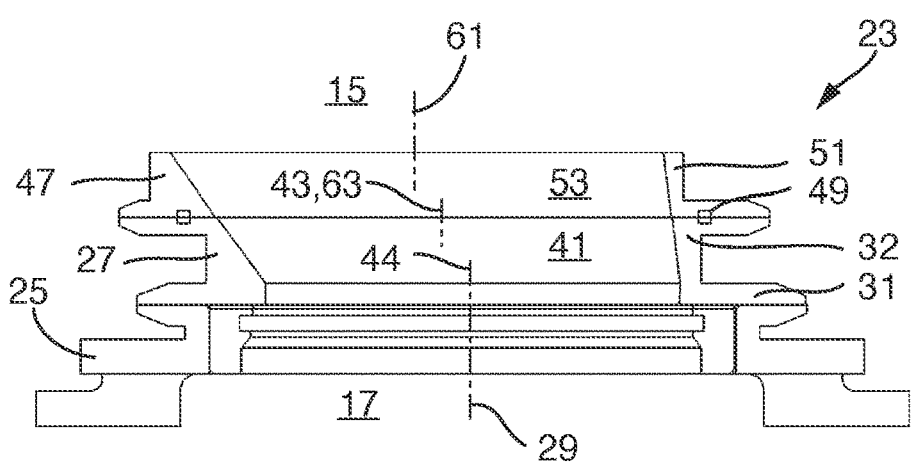
FIG. 7 shows the tolerance compensation device from FIG. 5, wherein the first and second pipe pieces are arranged in an extreme left-hand position.

In the example embodiment shown in FIGS. 5 to 7, the second pipe piece 27 has an eccentric shape, whereby, in the event of a rotation of the second pipe piece 27 relative to the first pipe piece 25 about the longitudinal axis 29, the second pipe piece 27 is movable relative to the first pipe piece 25 in the plane perpendicular to the longitudinal axis 29, and thus tolerance compensation in the plane can be realized.

The second pipe piece 27 has a first end 31 and an opposite second end 32 and a first channel 41 situated between the first and second ends 31, 32. The first end 31 is connected concentrically rotatably about the longitudinal axis 29 to the first pipe piece 25, and the first channel 41 runs obliquely with respect to the longitudinal axis 29, such that the second end 32 is arranged eccentrically with respect to the longitudinal axis 29. Here, the pipe cross section at the second end 32 is arranged eccentrically with respect to the longitudinal axis 29, that is to say is arranged offset with respect to the pipe cross section at the first end 31 perpendicularly with respect to the longitudinal axis 29, such that the central axis 43 of the second end 32 is parallel to and spaced apart from the central axis 44 of the first end 31 and from the longitudinal axis 29. The first channel 41 is of funnel-shaped form with a cross-sectional narrowing toward the first end 31 of the second pipe piece 27.

The tolerance compensation device 23 comprises a third pipe piece 47, which has a first end 49 and an opposite second end 51 and a second channel 53 situated between the first and second ends 49, 51. The first end 49 of the third pipe piece 47 is connected rotatably eccentrically with respect to the longitudinal axis 29 and concentrically with respect to the central axis 43 of the second end 32 of the second pipe piece 27 about an axis parallel and offset with respect to the longitudinal axis 29, to the second end 32 of the second pipe piece 27. The second end 51 of the third pipe piece 47 is connected to the second end 15 of the drain pipe 11.

The second channel 53 runs obliquely with respect to the longitudinal axis 29, such that the second end 51 of the third pipe piece 47 is arranged eccentrically with respect to the second end 32 of the second pipe piece 27 and with respect to the first end 49 of the third pipe piece 47. Here, the pipe cross section of the second end 51 of the third pipe piece 47 is arranged so as to be offset with respect to the pipe cross section of the first end 49 of the third pipe piece 47 and of the second end 32 of the second pipe piece 27 perpendicularly with respect to the longitudinal axis 29, such that the central axis 61 of the second end 51 of the third pipe piece 47 is parallel to and spaced apart from the central axis 63 of the first end 49 of the third pipe piece 47 and of the second end 32 of the second pipe piece 27.

Furthermore, the second channel 53 is of funnel-shaped form with a cross-sectional narrowing toward the first end 49 of the third pipe piece 47. The funnel shape of the second channel 53 is formed such that, in particular rotational positions of the third pipe piece 47 relative to the second pipe piece 27, for example in the extreme positions at the extreme right (see FIG. 5) and at the extreme left (see FIG. 7), in which the first channel 41 and the second channel 53 are in alignment and run in the same direction, the gradient of the funnel of the third pipe piece 47 at the transition to the second pipe piece 27 merges into the gradient of the funnel of the second pipe piece 27, such that a continuous transition without a bend is formed between the first channel 41 and the second channel 53, and a common funnel for receiving the second end 15 of the drain pipe 11 is formed by the second 27 and third pipe piece 47. The first, second and third pipe pieces 25, 27, 47 may however also be moved into a neutral rotational position relative to one another (see FIG.

6) in which the pipe cross section of the second end 51 of the third pipe piece 47 is arranged concentrically with the pipe cross section of the first pipe piece 25, that is to say the central axis 61 of the second end 51 of the third pipe piece 47 runs coaxially with the longitudinal axis 29. Here, the central axis 43 of the second end 32 of the second pipe piece 27 and the central axis 63 of the first end 49 of the third pipe piece 47 may be eccentric, that is to say parallel and offset, with respect to the central axis 61 of the second end 51 of the third pipe piece 47 and with respect to the longitudinal axis 29, as can be seen in FIG. 6.

Figure 8:
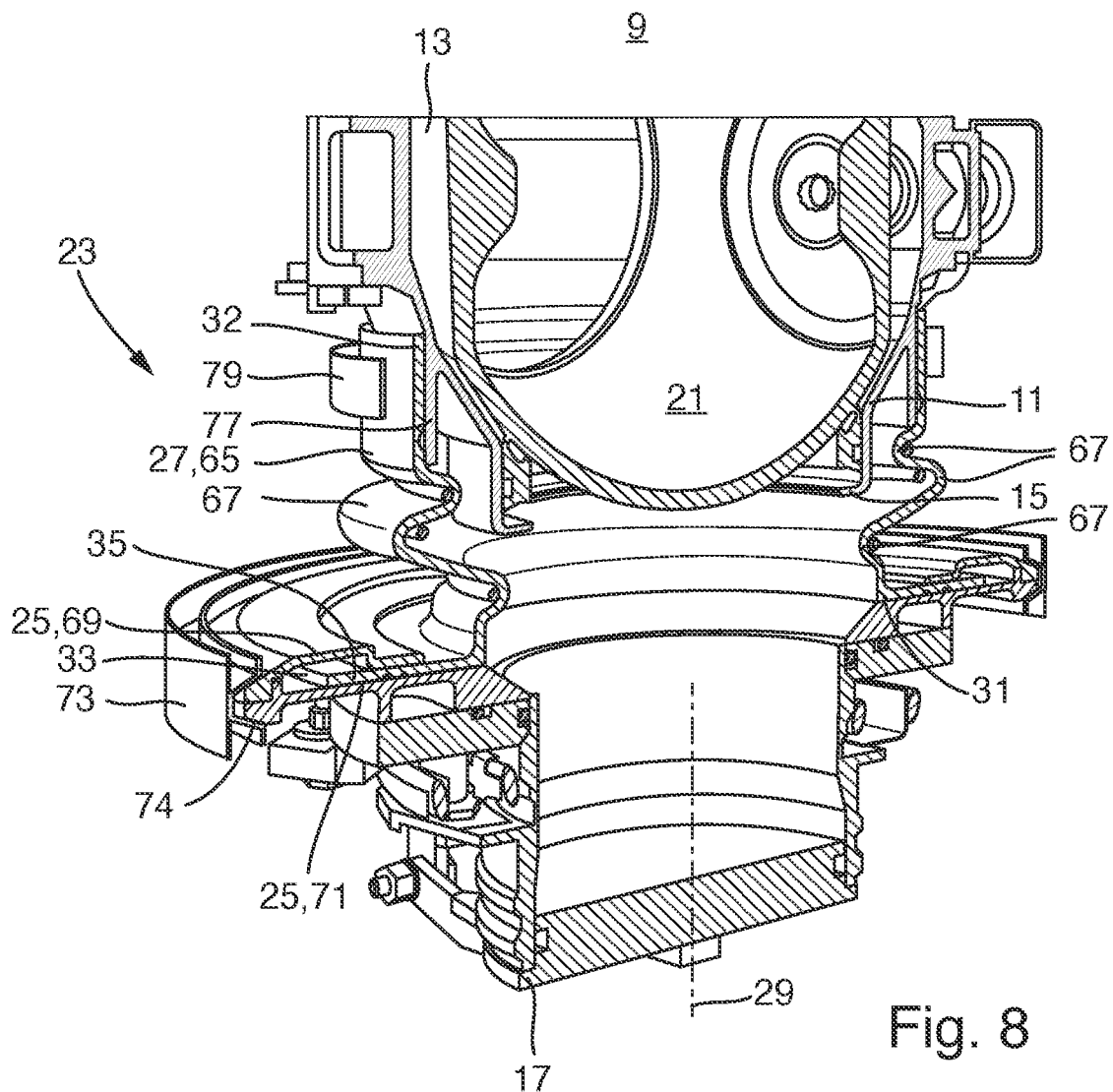
FIG. 8 shows a cross-sectional view of a tolerance compensation device according to a third example embodiment.
Figure 9:
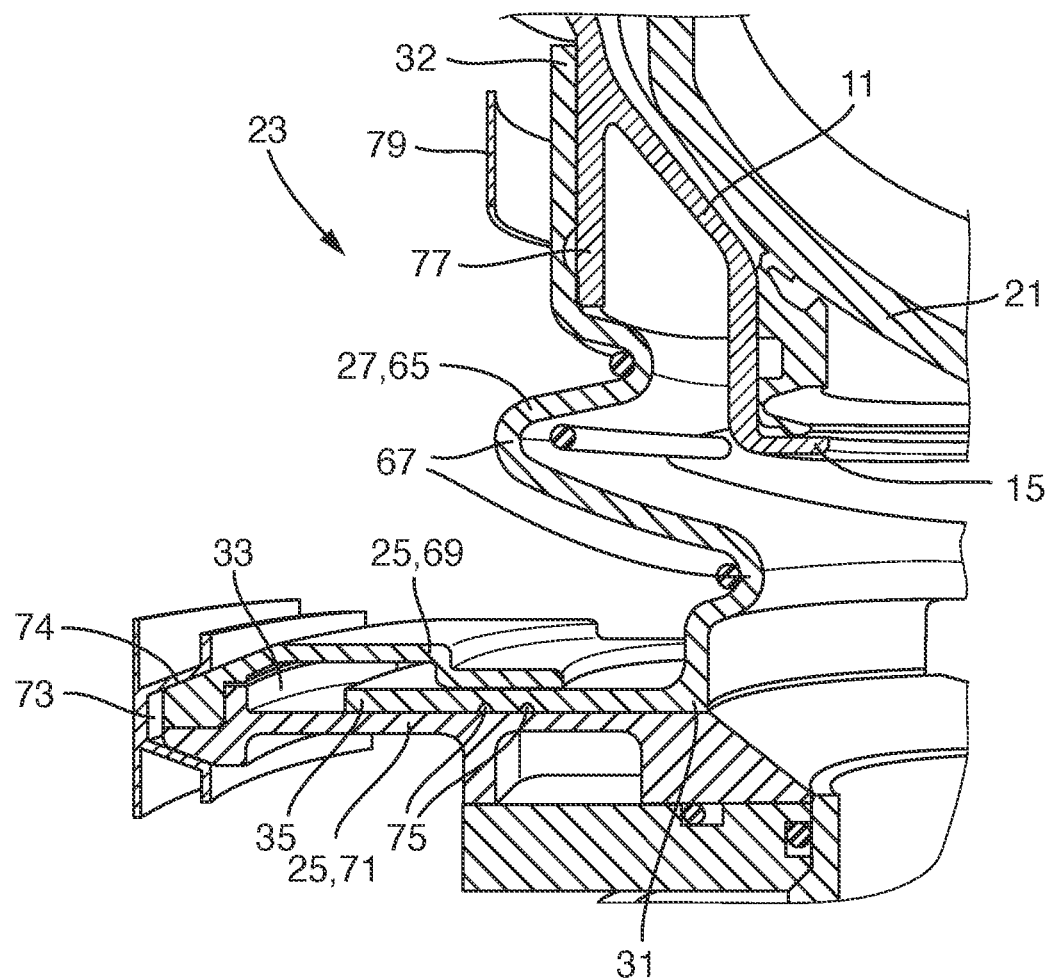
FIG. 9 shows a detailed view of the corrugated bellows of the tolerance compensation device from FIG. 8.

The example embodiment shown in FIGS. 8 and 9 differs from the example embodiment shown in FIGS. 3 and 4 primarily in that the second pipe piece 27 is of flexible form. Here, the second pipe piece 27 both has a flexible shape and is formed from a flexible material. Specifically, the second pipe piece is formed as a corrugated bellows 65 which, as viewed along the longitudinal axis 29, has multiple inwardly and outwardly projecting corrugations 67 which run in encircling fashion in a circumferential direction. Furthermore, the second pipe piece 27 is formed entirely or partially from a rubber material, which gives rise to not only elastic deformability but also insulation against cold and electrical charge. The second pipe piece 27 is thus flexible both in an axial direction and also in a radial direction and also with respect to twisting about the longitudinal axis 29 and about two transverse axes orthogonal with respect to the longitudinal axis 29. As in the embodiment from FIGS. 3 and 4, the second pipe piece 27 has, at its first end 31, an encircling and outwardly projecting flange 35 which projects with play into an encircling and inwardly open gap 33 of the first pipe piece 25, such that a movement of the flange 35 in the gap 33 and thus a movement of the second pipe piece 27 relative to the first pipe piece 25 perpendicularly with respect to the longitudinal axis 29 is made possible for the purposes of compensating installation and manufacturing tolerances during the assembly process.

After the installation and manufacturing tolerances have been compensated during the assembly process by the tolerance compensation device 23, as described above, the tolerance compensation device 23 can be fixed, which in the present example embodiment may be realized by virtue of the flange 35 being clamped in the gap 33, such that a movement of the flange 35 within the gap 33 is no longer possible and a movement of the second pipe piece 27 relative to the first pipe piece 25 is possible only by elastic deformation of the second pipe piece 27. The clamping of the flange 35 in the gap 33 can, in the present example embodiment, be realized by virtue of an upper disk 69 of the first pipe piece 25 above the gap 33 being pressed against a lower disk 71 the first pipe piece 25 below the gap 33, wherein the flange 35 is arranged between the upper disk 69 and the lower disk 71. The pressing and fixing of the upper disk 69 and of the lower disk 71 against one another may be performed by a clamping ring 73 which engages with the upper and the lower disk 69, 71 from radially outside. To implement secure clamping, a receptacle 74 of the clamping ring 73 is provided for encompassing the respective edge of the upper and lower disks 69, 71 in a V-shaped manner—a so-called V clamp. The edges of the disks 69 and 71 are, for this purpose, of conical shape correspondingly to the receptacle 74. In the present example embodiment, for further sealing, two encircling annular beads 75 are formed on the surface of the lower disk 71, which annular beads squeeze the flange 35 in punctiform fashion with even greater intensity and thus seal off the flange in a particularly effective manner.

In the present example embodiment, the second pipe piece 27 is connected to the drain pipe 11 by way of an attachment flange 77 which extends downward, parallel to the longitudinal axis 29, from the outer side of the drain pipe 11 and against which the upper second end 32 of the second pipe piece 27 is pressed by a tension ring 79 and thus fastened. Here, the drain pipe 11 extends with its lower second end 15 in a funnel shape into the upper opening at the second end 32 of the second pipe piece 27 and is connected at its upper first end 13 via a valve 21 to the wastewater tank 9. In the present embodiment, the drain pipe 11 is of very short and rigid form, which leads to a compact design.

By the tolerance compensation devices 23 of the example embodiments described above, installation and manufacturing tolerances between the wastewater tank 9 and the service panel 17 can be effectively compensated already during the course of the initial installation.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wastewater tank arrangement for an aircraft, the wastewater tank arrangement comprising:
   a wastewater tank;
   a drain pipe having a first end and a second end that is opposite the first end, wherein the first end of the drain pipe is fastened to the wastewater tank and the second end is configured for connection to a service panel in the aircraft; and
   a tolerance compensation device comprising:
      a first pipe piece; and
      a second pipe piece that has a first end, a second end that is opposite the first end, and a first channel situated between the first and second ends thereof;
      wherein the first end of the second pipe piece is connected to the first pipe piece such that the second pipe piece is rotatable relative to the first pipe piece about a longitudinal axis of the first pipe piece;
   wherein the tolerance compensation device is configured to connect the second end of the drain pipe to the service panel and compensate tolerances between the second end of the drain pipe and the service panel; and
   wherein, after assembly of the wastewater tank arrangement, the tolerance compensation device is configured to be fixed, such that a movement of the second pipe piece relative to the first pipe piece is not possible.

2. The wastewater tank arrangement according to claim 1, wherein the first pipe piece and the second pipe piece are arranged in series along a longitudinal axis, the second pipe piece being movable relative to the first pipe piece perpendicularly with respect to the longitudinal axis.

3. The wastewater tank arrangement according to claim 2, wherein the first pipe piece is movable relative to the second pipe piece two-dimensionally in a plane perpendicular to the longitudinal axis.

4. The wastewater tank arrangement according to claim 2, wherein the first pipe piece is configured to connect to the service panel and the second pipe piece is connected to the second end of the drain pipe.

5. The wastewater tank arrangement according to claim 4, wherein the second end of the drain pipe projects into the second pipe piece without being fixedly connected to the second pipe piece.

6. The wastewater tank arrangement according to claim 1, wherein:
   the first pipe piece has a gap which extends perpendicularly with respect to the longitudinal axis, is inwardly open, and runs in encircling fashion in a circumferential direction;
   the second pipe piece has a flange which extends outwardly perpendicularly with respect to the longitudinal axis; and
   the first and second pipe pieces are connected to one another such that the flange is arranged in the gap.

7. The wastewater tank arrangement according to claim 6, wherein the flange is arranged in the gap with play, such that the flange is movable in the gap perpendicularly with respect to the longitudinal axis.

8. The wastewater tank arrangement according to claim 7, wherein, when the flange moves in the gap perpendicularly with respect to the longitudinal axis, the second pipe piece also moves relative to the first pipe piece perpendicularly with respect to the longitudinal axis.

9. The wastewater tank arrangement according to claim 8, wherein the first pipe piece and the second pipe piece are movable relative to each other between a concentric position and an eccentric position.

10. The wastewater tank arrangement according to claim 1, wherein the second pipe piece has an eccentric shape, whereby, in an event of rotation of the second pipe piece relative to the first pipe piece about the longitudinal axis of the first pipe piece, a longitudinal axis of the second pipe piece is movable relative to the longitudinal axis of the first pipe piece.

11. The wastewater tank arrangement according to claim 10, wherein the first channel is positioned obliquely with respect to the longitudinal axis of the first pipe piece, such that the second end is arranged eccentrically with respect to the longitudinal axis of the first pipe piece.

12. The wastewater tank arrangement according to claim 11, wherein the first channel has a cross-section that narrows towards the first end of the second pipe piece, such that the first channel is narrower at the first end of the second pipe piece than at the second end of the second pipe piece.

13. The wastewater tank arrangement according to claim 11, wherein the second end of the second pipe piece is connected to the second end of the drain pipe.

14. The wastewater tank arrangement according to claim 10, wherein the tolerance compensation device comprises a third pipe piece that has a first end, a second end that is opposite the first end, and a second channel situated between the first and second ends thereof, the first end of the third pipe piece being rotatably connected to the second end of the second pipe piece, and the second end of the third pipe piece being connected to the second end of the drain pipe.

15. The wastewater tank arrangement according to claim 14, wherein the second channel is positioned obliquely with respect to the longitudinal axis of the first pipe piece, such that the second end of the third pipe piece is arranged eccentrically with respect to the second end of the second pipe piece.

16. The wastewater tank arrangement according to claim 14, wherein the second channel has a cross-section that widens towards the first second end of the third pipe piece, such that the second channel is wider at the second end of the third pipe piece than at the first end of the third pipe piece.

17. The wastewater tank arrangement according to claim 14, wherein the second end of the third pipe piece is concentric with the first pipe piece.

18. An aircraft comprising a wastewater tank arrangement according to claim 1.

* * * * *

UNITED STATES PATENT AND TRADEMARK OFFICE
CERTIFICATE OF CORRECTION

| | | |
|---|---|---|
| PATENT NO. | : 12,134,473 B2 | Page 1 of 1 |
| APPLICATION NO. | : 18/199087 | |
| DATED | : November 5, 2024 | |
| INVENTOR(S) | : Wilhelm Lutzer et al. | |

It is certified that error appears in the above-identified patent and that said Letters Patent is hereby corrected as shown below:

In the Claims

Column 12 Line 32 Claim 16: "widens towards the first second end of the third pipe piece," should be -- widens towards the second end of the third pipe piece, --.

Signed and Sealed this
Twelfth Day of August, 2025

Coke Morgan Stewart
*Acting Director of the United States Patent and Trademark Office*